(12) United States Patent
Kaneda

(10) Patent No.: US 8,305,205 B2
(45) Date of Patent: Nov. 6, 2012

(54) VEHICLE DISPLAY DEVICE

(75) Inventor: Kouji Kaneda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 888 days.

(21) Appl. No.: 12/385,254

(22) Filed: Apr. 2, 2009

(65) Prior Publication Data

US 2009/0251303 A1 Oct. 8, 2009

(30) Foreign Application Priority Data

Apr. 4, 2008 (JP) ................................. 2008-098396

(51) Int. Cl.
*B60Q 1/00* (2006.01)
(52) U.S. Cl. .................... 340/439; 340/438; 340/815.78; 340/441; 340/467; 340/456; 73/114.52; 701/99; 701/103; 701/104; 701/123
(58) Field of Classification Search .......... 340/438, 340/439, 691.1–691.7, 5.32, 815.78, 441, 340/467, 456; 701/123, 99, 103, 104; 73/114.52–114.54
See application file for complete search history.

(56) References Cited

U.S. PATENT DOCUMENTS

| | | | | |
|---|---|---|---|---|
| 3,908,451 A | * | 9/1975 | Walker et al. ............... | 73/114.53 |
| 3,922,909 A | * | 12/1975 | Dixson et al. ............... | 73/114.53 |
| 3,967,097 A | * | 6/1976 | Moretti .......................... | 701/123 |
| 4,050,295 A | * | 9/1977 | Harvey ....................... | 73/114.53 |
| 4,166,382 A | * | 9/1979 | Petersen .................... | 73/114.53 |
| 4,210,908 A | * | 7/1980 | Sakakibara ..................... | 345/40 |
| 4,217,644 A | * | 8/1980 | Kato et al. ..................... | 701/123 |
| 4,247,757 A | * | 1/1981 | Crump, Jr. .................... | 235/61 J |
| 4,342,023 A | * | 7/1982 | Tsunoda et al. .............. | 340/460 |
| 4,378,694 A | * | 4/1983 | Bohm et al. ............... | 73/114.53 |
| 4,400,779 A | * | 8/1983 | Kosuge et al. ................ | 701/123 |
| 4,437,342 A | * | 3/1984 | Hosaka et al. ............. | 73/114.52 |
| 4,475,380 A | * | 10/1984 | Colovas et al. ............. | 73/114.53 |
| 4,492,112 A | * | 1/1985 | Igarashi et al. ............ | 73/115.02 |
| 4,555,691 A | * | 11/1985 | Hosaka et al. ................ | 340/439 |
| 4,590,568 A | * | 5/1986 | Barske et al. .................... | 701/93 |
| 4,647,902 A | * | 3/1987 | Teshima et al. ............... | 340/439 |
| 4,663,718 A | * | 5/1987 | Augello et al. .............. | 701/527 |
| 4,706,083 A | * | 11/1987 | Baatz et al. .................... | 701/123 |
| 4,845,630 A | * | 7/1989 | Stephens ....................... | 701/123 |
| 5,627,752 A | * | 5/1997 | Buck et al. ...................... | 701/36 |

(Continued)

FOREIGN PATENT DOCUMENTS

JP 59015820 A * 1/1984
(Continued)

*Primary Examiner* — Daniel Wu
*Assistant Examiner* — Son M Tang
(74) *Attorney, Agent, or Firm* — McGinn IP Law Group, PLLC

(57) ABSTRACT

A vehicle display device is arranged in a vehicle having an idling stop function that automatically stops an engine when the vehicle temporarily stops. The device includes a control unit that calculates a deviation of a current instant fuel consumption with respect to an average fuel consumption in a past predetermined period of the vehicle; and a fuelometer that indicates fuel consumption information representing whether a current driving state of the vehicle decreases the average fuel consumption. When the vehicle is in the idling stop state, the fuelometer indicates that the deviation is 0 regardless of the instant fuel consumption and the average fuel consumption.

4 Claims, 8 Drawing Sheets

U.S. PATENT DOCUMENTS

| | | | |
|---|---|---|---|
| 5,781,872 A * | 7/1998 | Konishi et al. | 701/36 |
| 6,092,021 A * | 7/2000 | Ehlbeck et al. | 701/123 |
| 6,453,731 B1 * | 9/2002 | Yaegashi | 73/114.52 |
| 6,694,806 B2 * | 2/2004 | Kumagai et al. | 73/114.52 |
| 6,975,217 B2 * | 12/2005 | Endoh | 340/438 |
| 7,237,203 B1 * | 6/2007 | Kuenzner | 715/764 |
| 2008/0258891 A1 * | 10/2008 | Sato | 340/439 |

FOREIGN PATENT DOCUMENTS

| | | |
|---|---|---|
| JP | 2007-138926 | 6/2007 |
| JP | 2007-297026 | 11/2007 |
| JP | 2007-298022 | 11/2007 |
| JP | 2007-298491 | 11/2007 |
| JP | 2007-298494 | 11/2007 |

* cited by examiner

VEHICLE DISPLAY DEVICE

CROSS REFERENCE TO RELATED APPLICATIONS

The disclosure of Japanese Patent Application No. 2008-098396 filed on Apr. 4, 2008 including the specification, drawings and abstract is incorporated herein by reference in its entirety.

BACKGROUND OF THE INVENTION

1. Field of the Invention

The present invention relates to a vehicle display device arranged in a vehicle having a function that automatically stops an engine when the vehicle temporarily stops.

2. Description of the Related Art

For example, Japanese Unexamined Patent Application Publication No. 2007-138926 discloses a technique of indicating that a driving state is in a fuel-efficient state.

Also, Japanese Unexamined Patent Application Publication Nos. 2007-297026, 2007-298022, 2007-298491, and 2007-298494 disclose a technique of providing an indication based on a deviation of a current instant fuel consumption with respect to an average fuel consumption in a past predetermined period of a vehicle, and indicating whether a current driving state decreases or increases the average fuel consumption of the vehicle by way of deflection of a needle of a meter.

The technique indicating whether the current driving state decreases the average fuel consumption of the vehicle is in effective because the technique allows an occupant to visually recognize that a change in fuel consumption of the vehicle depends on the driving state, and promotes the occupant to perform a driving operation with a decreased fuel consumption.

Further, an idling stop function is in practical use as a technique of decreasing a fuel consumption of a vehicle. The idling stop function automatically stops an engine when a vehicle temporarily stops and automatically restarts the engine by a predetermined driving operation.

When the technique disclosed in Japanese Unexamined Patent Application Publication Nos. 2007-297026, 2007-298022, 2007-298491, and 2007-298494 is applied to the vehicle having the idling stop function, if the vehicle is in an idling stop state, the speed and fuel consumption of the vehicle becomes 0. Thus, a fuel consumption is not calculated, and the position of a needle is not determined. Hence, during idling stop, the needle is moved to, for example, a position corresponding to a zero return position of a stepping motor which drives the needle.

The zero return position of the stepping motor which drives the needle is typically arranged outside the scale of the meter. Thus, the needle may be maximally deflected in a direction in the idling stop state with the technique disclosed in Japanese Unexamined Patent Application Publication Nos. 2007-297026, 2007-298022, 2007-298491, and 2007-298494.

Since the idling stop state with the speed and fuel consumption being 0 does not change the average fuel consumption of the vehicle, the maximum deflection of the needle in a direction in which the average fuel consumption is increased or a direction in which the average fuel consumption is decreased is an incorrect indication. This may provide the occupant uncomfortable feeling.

SUMMARY OF THE INVENTION

The present invention is made to address the above-described problems, and an object of the present invention is to provide a vehicle display device in a vehicle having an idling stop function, the vehicle indication device being capable of correctly indicating whether a current driving state decreases an average fuel consumption of the vehicle.

A vehicle display device according to an aspect of the present invention is arranged in a vehicle having an idling stop function that automatically stops an engine when the vehicle temporarily stops. The device includes a control unit that calculates a deviation of a current instant fuel consumption with respect to an average fuel consumption in a past predetermined period of the vehicle; and a fuelometer that indicates fuel consumption information representing whether a current driving state of the vehicle decreases the average fuel consumption. When the vehicle is in the idling stop state, the fuelometer indicates that the deviation is 0 regardless of the instant fuel consumption and the average fuel consumption.

In the vehicle having the idling stop function, the vehicle display device of the aspect of the present invention can correctly indicate whether the current driving state decreases the average fuel consumption of the vehicle.

DESCRIPTION OF THE PREFERRED EMBODIMENTS

Figure 1:
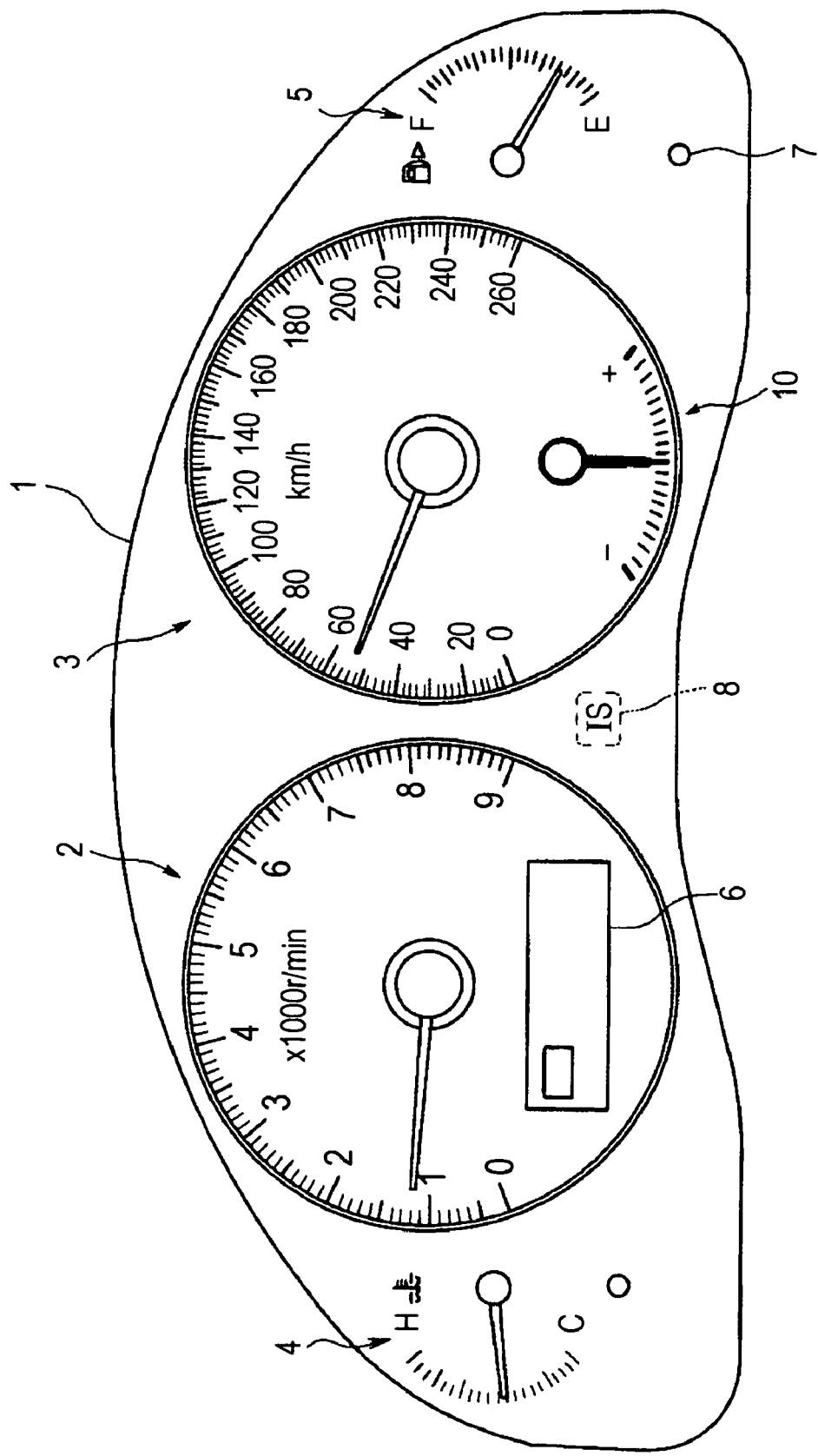
FIG. 1 illustrates a combination meter.

Vehicle display devices according to preferred embodiments of the present invention are described below with reference to the attached drawings. In the drawings accompanying the following description have different scales for components so that the components have sizes recognizable in the drawings. The number, shapes, size ratio, and relative positional relationship of the components of the present invention are not limited those illustrated in the drawings.

Also, the term "unit" in the following description is a conceptual term corresponding to a function in the embodiments, and hence the term "unit" does not always one-to-one correspond to hardware or a software routine. For example, while an electrical control unit (ECU) that controls an operation of a vehicle is described in the embodiments to include a function unit for providing a predetermined function, the function owned by the function unit may be provided by hardware having a predetermined electronic circuit, software having a predetermined routine executable by a microcomputer, or combination of both. Further, when steps in processing of the embodiments are executed, the execution sequence of the steps may be changed, some of the steps may be simultaneously executed, or the execution sequence of the steps may be varied every execution of the steps.

First Embodiment

A first embodiment of the present invention is described below with reference to FIGS. 1 to 4. In this embodiment, the present invention is applied to an display device arranged in a vehicle having an idling stop function that automatically stops an engine when the vehicle temporarily stops.

A combination meter 1 shown in FIG. 1 is arranged in front of a driver seat of a vehicle. The combination meter 1 is an display device that indicates predetermined information on an indication panel to provide the information to an occupant of the vehicle.

The combination meter 1 in this embodiment includes a tachometer 2 that indicates an engine speed, a speedometer 3 that indicates a vehicle speed, a temperature gauge 4 that indicates a coolant temperature, a fuel gauge 5 that indicates a remain amount of fuel, a multi-information display 6 that indicates a value of a tripmeter, a value of an odometer, an outside air temperature, etc., in response to an instruction operation of the occupant, and an indicator lamp (not shown) that indicates a state of the vehicle by being lit.

Also, a trip reset switch 7, which is a push switch, is arranged at the combination meter 1 to protrude toward the driver seat. The value of the tripmeter is reset to 0 when the trip reset switch 7 is pressed for a predetermined time.

Further, though described below in more detail, an idling stop indicator lamp 8 and a fuelometer 10 are arranged at the combination meter 1. The idling stop indicator lamp 8 indicates whether the vehicle is in an idling stop state by being lit. The fuelometer 10 indicates fuel consumption information representing whether a current driving state decreases an average fuel consumption.

The tachometer 2, speedometer 3, temperature gauge 4, fuel gauge 5, and fuelometer 10 each are an indication device with a needle which is rotationally driven by a stepping motor. The multi-information display 6 is an indication device formed of, for example, an organic electroluminescence (EL) display device or a liquid crystal display device, and being capable of displaying an image.

Figure 2:
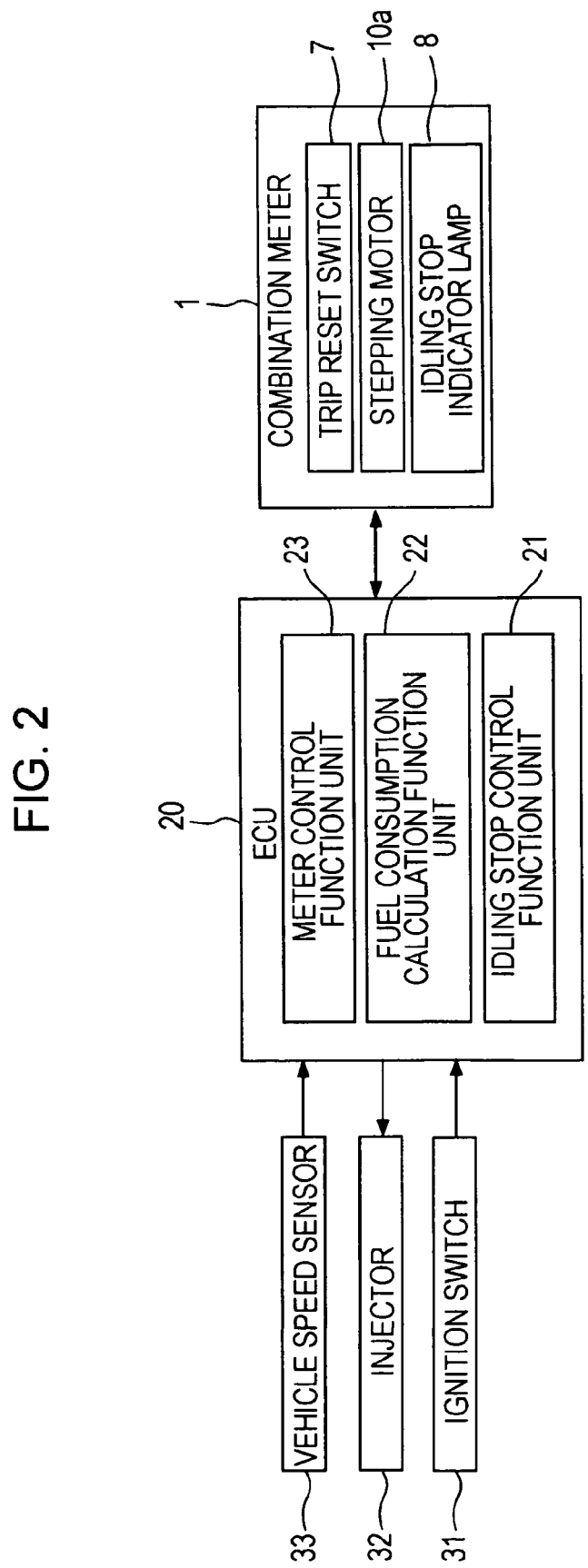
FIG. 2 illustrates a control unit of a fuelometer.

Referring to FIG. 2, the combination meter 1 is connected to an electrical control unit (ECT) 20 serving as a control unit such that communication is allowed therebetween by known wired or wireless communication means. The ECU 20 includes an arithmetic unit, a storage unit, and an input/output unit, and controls the operation of the vehicle in accordance with a predetermined program.

The ECU 20 is electrically connected to an ignition switch 31 provided at the driver seat, an injector 32 that injects a predetermined amount of fuel to a combustion chamber of the engine, and a vehicle speed sensor 33 that outputs vehicle speed information corresponding to a speed of the vehicle. The vehicle speed sensor 33 is formed of, for example, a sensor that detects the number of rotations of an output shaft of a transmission, or a sensor that detects the number of rotations of a wheel.

Though not shown, the ECU 20 receives information from an engine speed sensor, a coolant temperature sensor, a fuel remain sensor, etc. The ECU 20 controls an operation of the combination meter 1 on the basis of the information input from these sensors.

The ECU 30 includes an idling stop control function unit 21, a fuel consumption calculation function unit 22, and a meter control function unit 23 as function units to provide functions (described below). These function units are provided, for example, by executing a predetermined software routine by the arithmetic unit on the basis of the information input to the ECU 20.

The idling stop control function unit 21 is a function unit that provides control to stop the engine if a predetermined condition is satisfied when the vehicle temporarily stops, and to restart the engine in association with a predetermined operation of the occupant.

The idling stop control function unit 21 temporarily stops the engine, for example, when the vehicle temporarily stops, or when the vehicle speed is 0 and the engine is in an idling state for a predetermined time or longer. In the following description, the temporary stop state of the engine is called an idling stop state.

Also, the idling stop control function unit 21 restarts the engine, for example, if a brake pedal is released or an accelerator pedal is depressed in the idling stop state.

In this embodiment, the idling stop control function unit 21 outputs an idling stop signal, representing the idling stop state, during the idling stop state. The idling stop indicator lamp 8 of the combination meter 1 is lit in response to the idling stop signal.

The fuel consumption calculation function unit 22 calculates the fuel consumption of the vehicle by using a travel distance of the vehicle in a predetermined period obtained by the output of the vehicle speed sensor 33, and a fuel injection amount in a predetermined period obtained by the injector 32. In this embodiment, the fuel consumption calculation function unit 22 calculates and outputs a trip average fuel consumption FCav and an instant fuel consumption FCi (both described below).

The trip average fuel consumption FCav is calculated by using, for example, a current travel distance since the value of the tripmeter is reset to 0 by the trip reset switch 7 of the combination meter 1, and a current fuel injection amount since the value of the tripmeter is reset to 0.

The instant fuel consumption FCi is calculated by using a travel distance and a fuel injection amount in a latest predetermined period, for example, in a latest period of 0.1 second.

In this embodiment, the trip average fuel consumption FCav and instant fuel consumption FCi each are expressed, for example, by a travel distance per liter of fuel consumption (km/L). Alternatively, the fuel consumption may be expressed by a fuel consumption amount per predetermined travel distance. As an example of expressing the fuel consumption by the fuel consumption amount per predetermined travel distance, for example, a method is known in which the fuel consumption is expressed by a fuel consumption amount per travel distance of 100 km (L/100 km).

Also, the fuel consumption calculation function unit 22 calculates and outputs a deviation d of the latest instant fuel consumption FCi with respect to the trip average fuel consumption FCav.

The meter control function unit 23 is a function unit that controls rotation positions of stepping motors for driving needles included in the combination meter 1, lighting of the indicator lamp, and an image to be displayed on the multi-information display 6, on the basis of a signal input to the ECU 20 and a result of processing executed by the ECU 20.

The detailed configuration and operation of the fuelometer 10 of this embodiment are described below.

The fuelometer 10 includes a needle 11 which is rotationally driven by a stepping motor 10a arranged on the back side of the indication panel of the combination meter 1, the needle 11 being rotated on a plane substantially parallel to the indication panel around a support shaft 10b.

Figure 3:
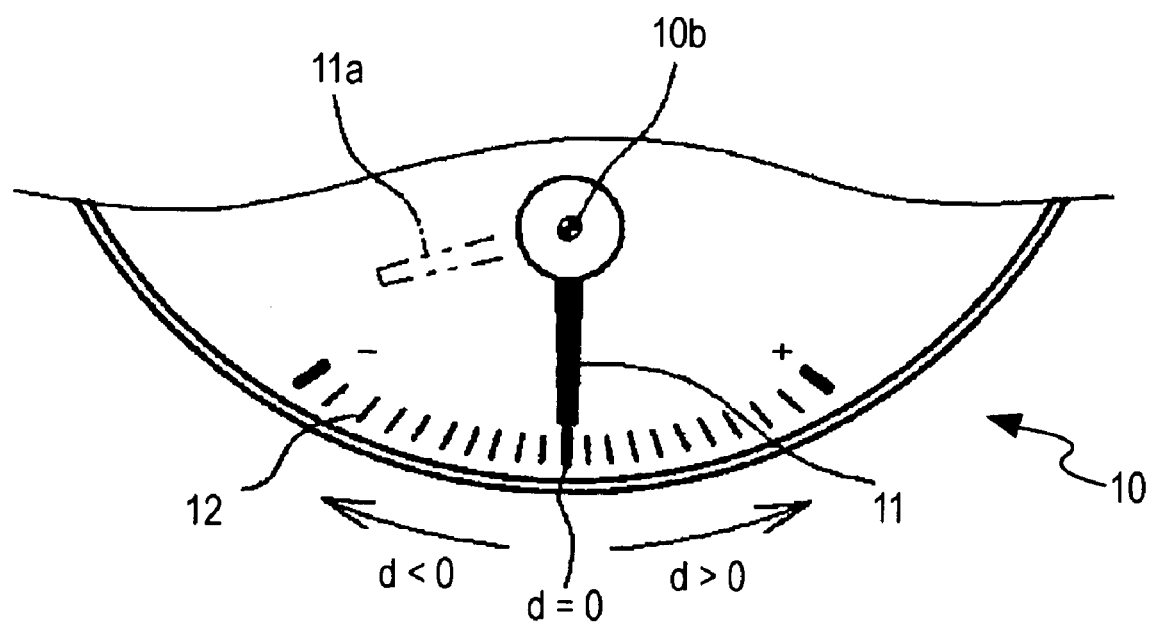
FIG. 3 illustrates the fuelometer in detail.

Referring to FIG. 3, a scale 12 of the fuelometer 10 in this embodiment has a plus indication (+) arranged in a counter-clockwise direction and a minus indication (−) arranged in a clockwise direction with reference to a 0 position arranged at a vertically lower side of the support shaft 10b, i.e., at the 6 o'clock position, when viewed from the occupant.

The position indicated by the needle 11 when the stepping motor 10a returns to zero, that is, when the stepping motor 10a returns to origin is a position 11a, so that the needle 11 is maximally deflected in the clockwise direction to a position outside the most minus-side indication of the scale 12 as shown in FIG. 3.

The position indicated by the needle 11 of the fuelometer 10 is determined in accordance with the above-described deviation d. When the deviation d is 0, the needle 11 indicates the 0 position of the scale 12. When the deviation d is plus, the needle 11 is deflected in a plus direction of the scale 12 in accordance with an absolute value of the deviation d. When the deviation d is minus, the needle 11 is deflected in a minus direction of the scale 12 in accordance with an absolute value of the deviation d.

In other words, the fuelometer 10 indicates whether the current driving state decreases the trip average fuel consumption FCav of the vehicle, and the degree of the state, by a deflection direction and a deflection angle of the needle 11.

Figure 4:
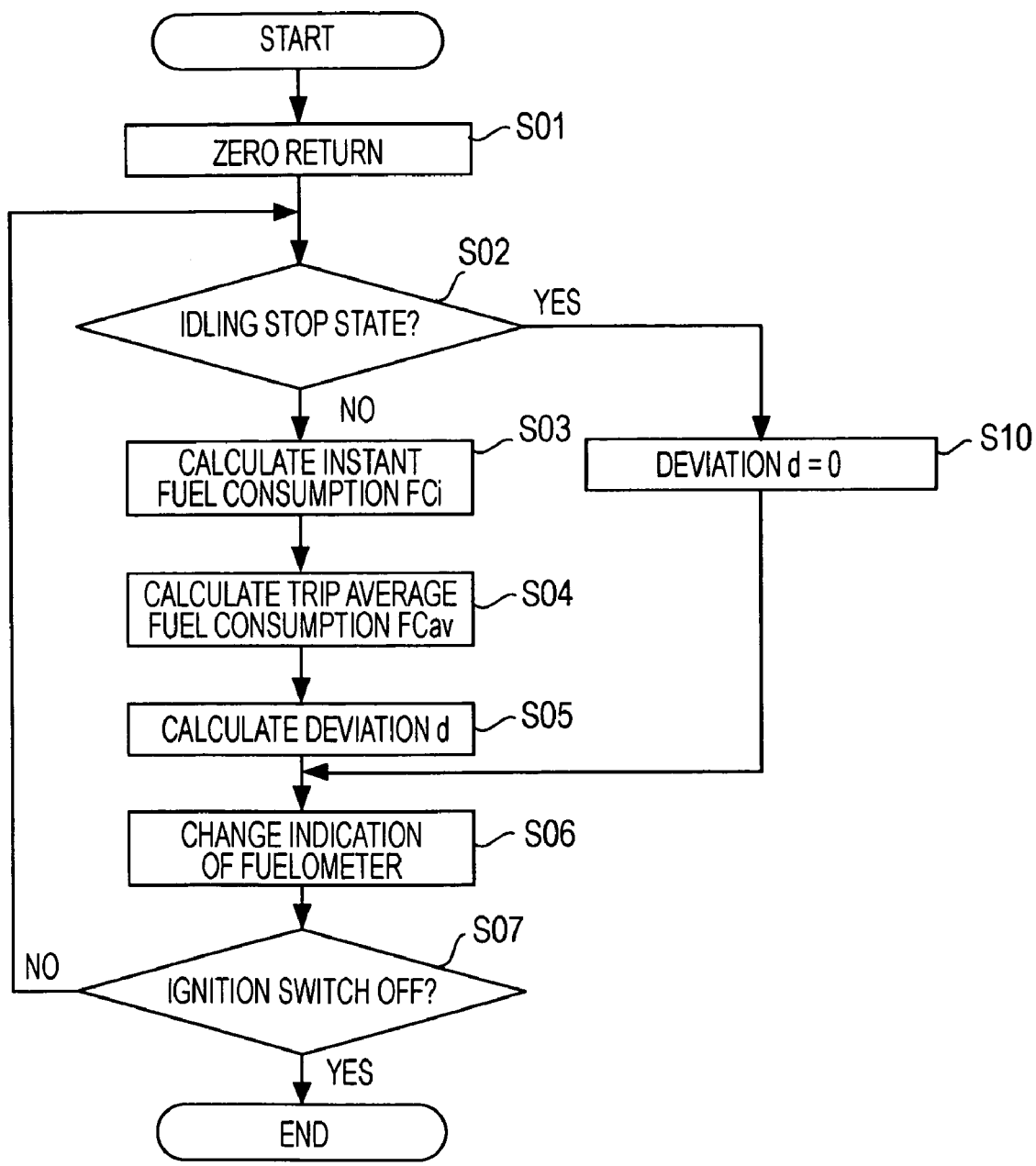
FIG. 4 is a flowchart of a control routine of the fuelometer.

The indication operation of the fuelometer 10 having the above-described configuration is controlled by the ECU 20 by a routine shown in FIG. 4. The routine is executed after the occupant turns ON the ignition switch 31.

When the occupant turns ON the ignition switch 31, zero return operation of the stepping motor 10a is performed in step S01. In step S02, it is determined whether the vehicle is in the idling stop state.

If it is determined that the vehicle is not in the idling stop state in step S02, the routine shifts to step S03. In step S03, the latest instant fuel consumption FCi is calculated. In step S04, the trip average fuel consumption FCav is calculated.

In step S05, the deviation d of the latest instant fuel consumption FCi with respect to the trip average fuel consumption FCav is calculated. In step S06, the rotation position of the stepping motor 10a is controlled on the basis of the deviation d, to update the indication position of the needle 11 of the fuelometer 10.

In step S06, for example, when the deviation d is 0, the needle 11 of the fuelometer 10 indicates the 0 position of the scale 12. When the deviation d is plus, the needle 11 of the fuelometer 10 is deflected in the plus direction of the scale 12 in accordance with the absolute value of the deviation d. When the deviation d is minus, the needle 11 of the fuelometer 10 is deflected in the minus direction of the scale 12 in accordance with the absolute value of the deviation d.

In step S07, it is determined whether the ignition switch 31 is OFF. If the ignition switch 31 is OFF, the control of the fuelometer 10 is ended. If the ignition switch 31 is still ON, the routine returns to step S02.

In particular, when the ignition switch 31 of the vehicle is ON and the engine is in the driving state, the processing from steps S03 to S06 is repeated with a predetermined cycle. In this state, when the instant fuel consumption FCi is above the trip average fuel consumption FCav, the needle 11 of the fuelometer 10 is deflected in the plus direction, and when the instant fuel consumption FCi is below the trip average fuel consumption FCav, the needle 11 of the fuelometer 10 is deflected in the minus direction.

The occupant of the vehicle sees the deflection direction and the deflection angle of the needle 11 of the fuelometer 10, and hence, the occupant can recognize whether the current driving state of the vehicle decreases or increase the average fuel consumption.

Meanwhile, if it is determined that the vehicle is in the idling stop state in step S02, the deviation d is determined as 0 and output in step S10. Then, the routine shifts to step S06, in which the rotation position of the stepping motor 10a is controlled on the basis of the deviation d, to update the indication position of the needle 11 of the fuelometer 10.

In particular, when the ignition switch 31 of the vehicle is ON and the vehicle is in the idling stop state, the needle 11 of the fuelometer 10 indicates the 0 position of the scale 12.

In this embodiment, in the vehicle having the idling stop function, the fuelometer 10 indicates 0 in the idling stop state which does not change the trip average fuel consumption FCav. Accordingly, the fuel consumption information representing whether the current driving state decreases the average fuel consumption of the vehicle can be correctly indicated. Thus, the fuelometer 10 of this embodiment does not provide the occupant uncomfortable feeling with the indication.

In the above-described embodiment, while the stepping motor 10a is controlled such that the needle 11 of the fuelometer 10 indicates 0 in the idling stop state, the present invention is not limited thereto.

Figure 5:
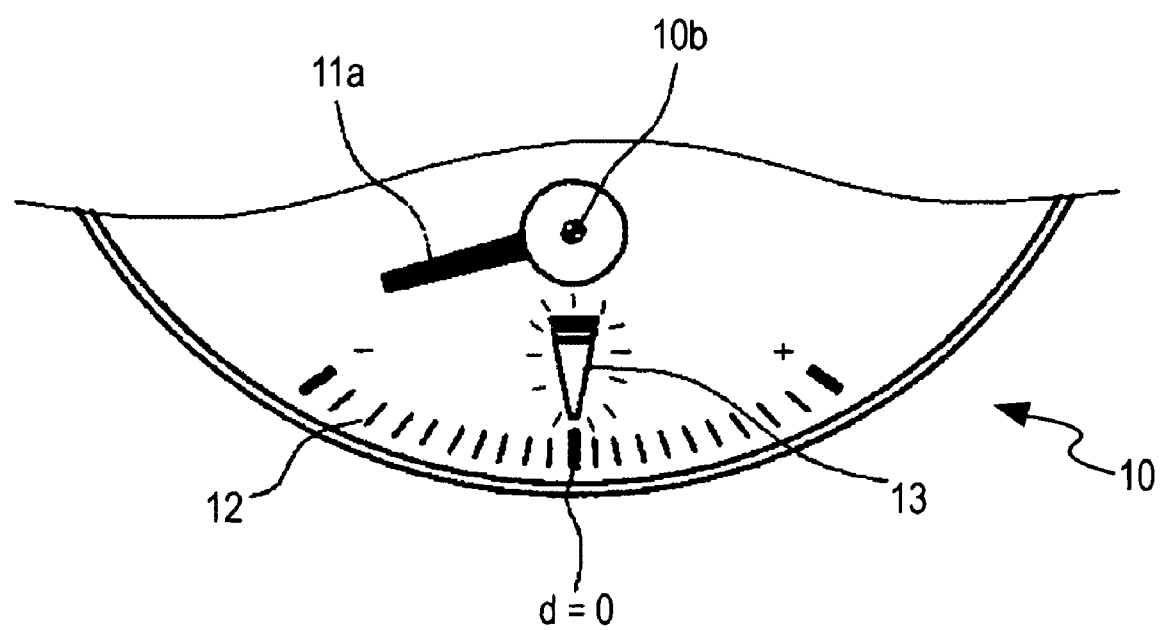
FIG. 5 illustrates a modification of a fuelometer.

For example, referring to FIG. 5, an indicator lamp 13 having a symbol shape indicating 0 of the scale 12 may be arranged at the indication panel of the fuelometer 10 in addition to the needle 11. When the vehicle is in the idling stop state, the indicator lamp 13 may be lit or blinked.

In the modification shown in FIG. 5, since the indicator lamp 13 is lit or blinked, the occupant can visually correctly recognize that the current driving state does not change the trip average fuel consumption FCav.

The indicator lamp 13 in this modification may be lit in response to the same control signal to that of the idling stop indicator lamp 8 of the combination meter 1. With this configuration, the present invention may be applied to an existing fuelometer without changing a control routine of the fuelometer.

Second Embodiment

Figure 6:
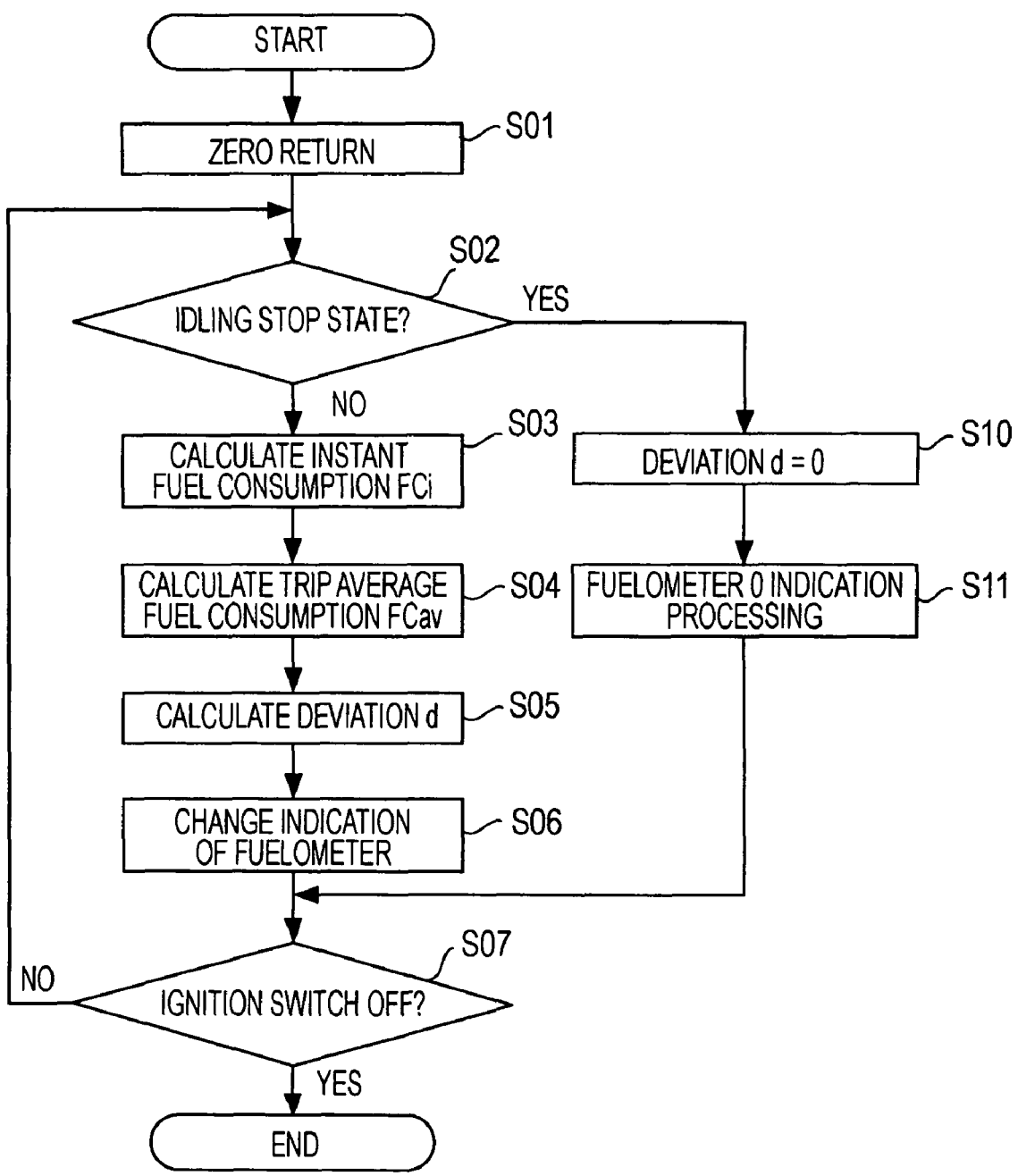
FIG. 6 is a flowchart of a control routine of a fuelometer according to a second embodiment.
Figure 7:
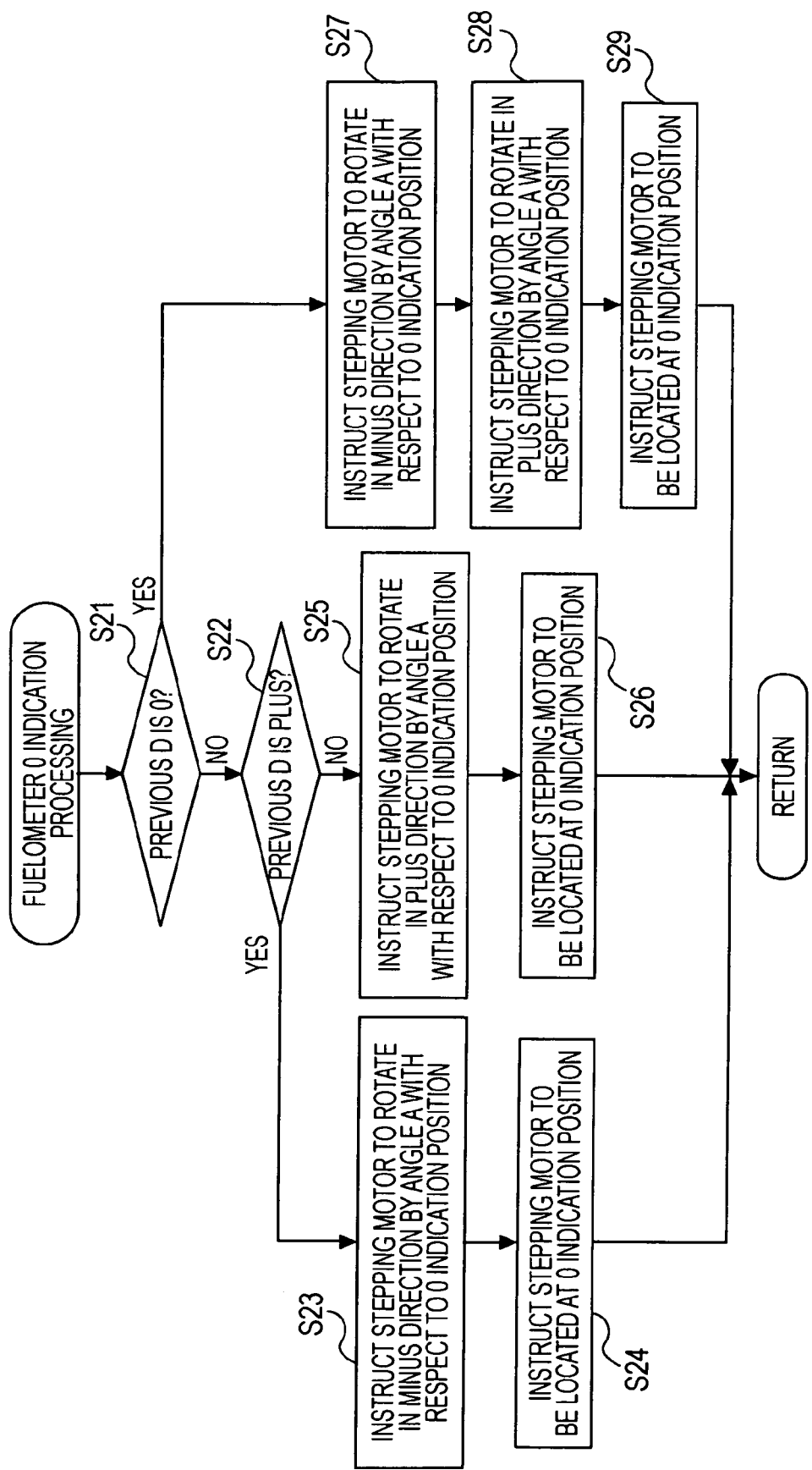
FIG. 7 is a flowchart of fuelometer 0 indication processing according to the second embodiment.

A second embodiment of the present invention is described below with reference to FIGS. 6 to 8. FIG. 6 is a flowchart of a control routine of a fuelometer according to the second embodiment. FIG. 7 is a flowchart of fuelometer 0 indication processing according to the second embodiment.

The second embodiment is different from the above-described first embodiment in the detail of the control method of the stepping motor 10a of the fuelometer 10 when the vehicle is in the idling stop state. Hence, merely the difference is described below. Also, like components refer like numerals as in the first embodiment, and their redundant descriptions are omitted.

Referring to FIG. 6, a control routine of the fuelometer 10 of this embodiment is different from that of the first embodiment in the processing executed after it is determined that the vehicle is in the idling stop state in step S02.

In this embodiment, if it is determined that the vehicle is in the idling stop state in step S02, the deviation d is determined as 0 and is output in step S10. Then, in step S11, fuelometer 0 indication processing (described below with reference to FIG. 7) is executed, to control the stepping motor 10a such that the needle 11 of the fuelometer 10 indicates 0.

The detail of the fuelometer 0 indication processing in step S11 is described below. In the fuelometer 0 indication processing, first, it is determined whether a previous deviation d is 0 in step S21. In particular, in step S21, it is determined whether the needle 11 of the fuelometer 10 is controlled to indicate 0 until just before this step.

If the previous deviation d is not 0 in step S21, i.e., if the needle 11 is controlled to indicate a position of the scale 12 in the plus or minus direction, the processing shifts to step S22.

In step S22, it is determined whether the previous deviation d is plus. If the previous deviation d is plus, the processing shifts to S23. If the previous deviation d is not plus, i.e., if the previous deviation d is minus, the processing shifts to step S25.

In step S23, a signal is sent to the stepping motor 10a so that the needle 11 indicates a position deflected in the minus direction by a predetermined angle A for a predetermined time t. Then, in step S24, a signal is sent to the stepping motor 10a so that the needle 11 indicates 0.

The stepping motor 10a typically involves a hysteresis error in which an error occurs at a static position depending on a rotation direction toward the static position. In this embodiment, for example, when the angle of the hysteresis error is about 1 degree, the predetermined angle A is set to 1 degree. The predetermined time t is set to a time from when the rotation position of the stepping motor 10a is changed to when the needle 11 is moved in response to the rotation of the stepping motor 10a. For example, the predetermined time t is set to tens of milliseconds. Predetermined angles A and predetermined times t may be experimentally obtained.

In particular, in step S23, the stepping motor 10a is controlled such that the stepping motor 10a passes a position at which the needle 11 is expected to indicate 0 by a predetermined angle δA. Then, in step S24, the stepping motor 10a is controlled to the rotation position at which the needle 11 is expected to indicate 0. Then, the processing returns to the main routine in FIG. 6.

Meanwhile, if it is determined that the previous deviation d is minus in step S22, a signal is sent to the stepping motor 10a so that the needle 11 indicates a position deflected in the plus direction by a predetermined angle A for a predetermined time t in step S25. Then, in step S26, a signal is sent to the stepping motor 10a so that the needle 11 indicates 0.

In particular, in step S25, the stepping motor 10a is controlled such that the stepping motor 10a passes a position at which the needle 11 is expected to indicate 0 by a predetermined angle δA. Then, in step S26, the stepping motor 10a is controlled to the rotation position at which the needle 11 is expected to indicate 0. Then, the processing returns to the main routine in FIG. 6.

If it is determined that the previous deviation d is 0 in step S21, the processing shifts to step S27.

In step S27, a signal is sent to the stepping motor 10a so that the needle 11 indicates a position deflected in the minus direction by a predetermined angle A for a predetermined time t. In step S28, a signal is sent to the stepping motor 10a such that the needle 11 indicates a position deflected in the plus direction by a predetermined angle A for a predetermined time t.

Then, in step S29, a signal is sent to the stepping motor 10a such that the needle 11 indicates 0.

In particular, in steps S27 and S28, the stepping motor 10a is controlled to be deflected in the plus or minus direction by a predetermined angle δA corresponding to a hysteresis error of the stepping motor 10a from a position at which the needle 11 is expected to indicate 0. Then, in step S29, the stepping motor 10a is controlled to the rotation position at which the needle 11 is expected to indicate 0. Then, the processing returns to the main routine in FIG. 6.

In the above-described embodiment, the hysteresis error of the stepping motor 10a can be compensated regardless of the previous indication position of the needle 11 of the fuelometer 10 when the vehicle is brought into the idling stop state. The needle 11 can be positioned so as to correctly indicate 0 of the scale 12. With the embodiment, the fuel consumption information representing whether the current driving state decreases the average fuel consumption of the vehicle can be further correctly indicated.

Figure 8:
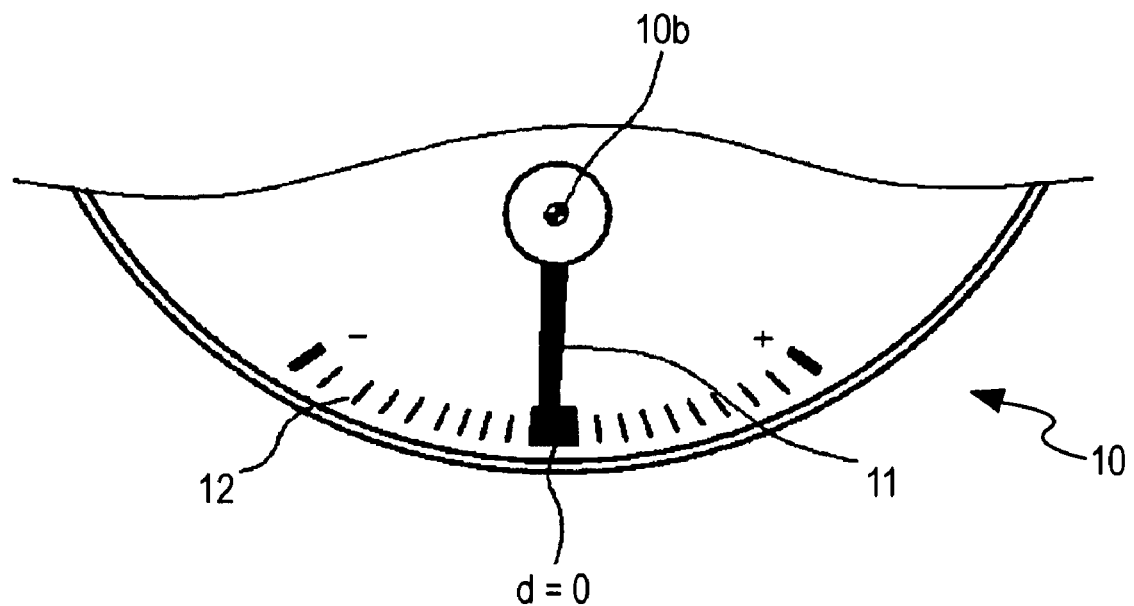
FIG. 8 illustrates a modification of a fuelometer according to the second embodiment.

In this embodiment, while the control of the stepping motor 10a is executed as shown in the flowchart in FIG. 7 in order to compensate the hysteresis error of the stepping motor 10a, for example as shown in FIG. 8, a bar representing 0 of the scale 12 may have an increased width to cover the hysteresis error of the stepping motor 10a, thereby reducing the uncomfortable feeling of the occupant. A similar advantage can be attained even when the width of the needle 11 is increased instead of the bar of the scale 12.

The type of the fuelometer 10 is not limited to a fuelometer with a needle driven by a motor as described in the embodiment. For example, the fuelometer 10 may be displayed on an image display device, such as a liquid crystal display device or an organic EL display device.

In the above-described embodiment, while the average fuel consumption is reset in response to the operation of the trip reset switch or the like, the present invention is not limited thereto. For example, an average fuel consumption may be calculated on the basis of an integrated value of travel distances and an integrated value of fuel injection amounts since delivery of the vehicle.

The present invention is not limited to the above-described embodiments, and may be modified as long as the modification is within the subject matter and concept of the invention which can be read from the appended claims and the specification. The modified vehicle display device should be within the technical scope of the present invention.

What is claimed is:

1. A vehicle display device arranged in a vehicle having an idling stop function that automatically stops an engine when the vehicle temporarily stops, the device comprising:
   a control unit that calculates a deviation of a current instant fuel consumption with respect to an average fuel consumption in a past predetermined period of the vehicle; and
   a fuelometer that indicates fuel consumption information representing whether a current driving state of the vehicle decreases the average fuel consumption,
   wherein when the vehicle is in the idling stop state, the fuelometer indicates that the deviation is 0 regardless of the instant fuel consumption and the average fuel consumption.

2. The vehicle display device according to claim 1,
   wherein the fuelometer is a meter with a needle arranged on an indication panel in a deflecting manner, the meter indicating the fuel consumption information by deflecting the needle in accordance with the deviation in a plus direction or a minus direction from a 0 position arranged on the indication panel, and
   wherein when the vehicle is in the idling stop state, needle indicates the 0 position to indicate that the deviation is 0.

3. The vehicle display device according to claim 2,
   wherein the fuelometer comprises the needle driven by the stepping motor, and
   wherein when the vehicle is in the idling stop state, the control unit controls the stepping motor to be deflected by a predetermined angle at a position at which the needle indicates the 0 position.

4. The vehicle indication device according to claim 1,
   wherein the fuelometer is a meter with a needle arranged on an indication panel in a deflecting manner, the meter indicating the fuel consumption information by deflecting the needle in accordance with the deviation in a plus direction or a minus direction from a 0 position indicated on the indication panel, and wherein when the vehicle is in the idling stop state, an indicator lamp arranged near the 0 position of the indication panel is lit or blinked to indicate that the deviation is 0.

* * * * *